United States Patent [19]

Chapman

[11] 3,958,216

[45] May 18, 1976

[54] TWO-WIRE MULTIPLEX SEISMIC RECORDING SYSTEM

[75] Inventor: William L. Chapman, Ponca City, Okla.

[73] Assignee: Continental Oil Company, Ponca City, Okla.

[22] Filed: Mar. 18, 1974

[21] Appl. No.: 451,747

[52] U.S. Cl............... 340/15.5 GC; 340/15.5 TS; 325/410
[51] Int. Cl.².................. G01V 1/00; H04B 1/16
[58] Field of Search............ 340/15.5 GC, 15.5 TS; 325/410, 413

[56] References Cited
UNITED STATES PATENTS

| | | | |
|---|---|---|---|
| 2,723,387 | 11/1955 | Slavin | 340/15.5 GC |
| R23,919 | 1/1955 | Hawkins | 340/15.5 R |

*Primary Examiner*—T. H. Tubbesing
*Assistant Examiner*—S. C. Buczinski
*Attorney, Agent, or Firm*—William J. Miller

[57] ABSTRACT

Apparatus for interconnection of seismic receivers using a two-wire connection and utilizing frequency diversification to maintain separation of received energy from each of the individual seismic receivers. Each seismic receiver is used in combination with a local oscillator having an individually distinctive frequency for modulated output and transmission via a two-wire conductor to a remote or centralized seismic signal processing or recording station. A module receiving each seismic receiver output provides gain controlled amplification prior to modulation of the output on a transmission carrier having a selected frequency.

10 Claims, 4 Drawing Figures

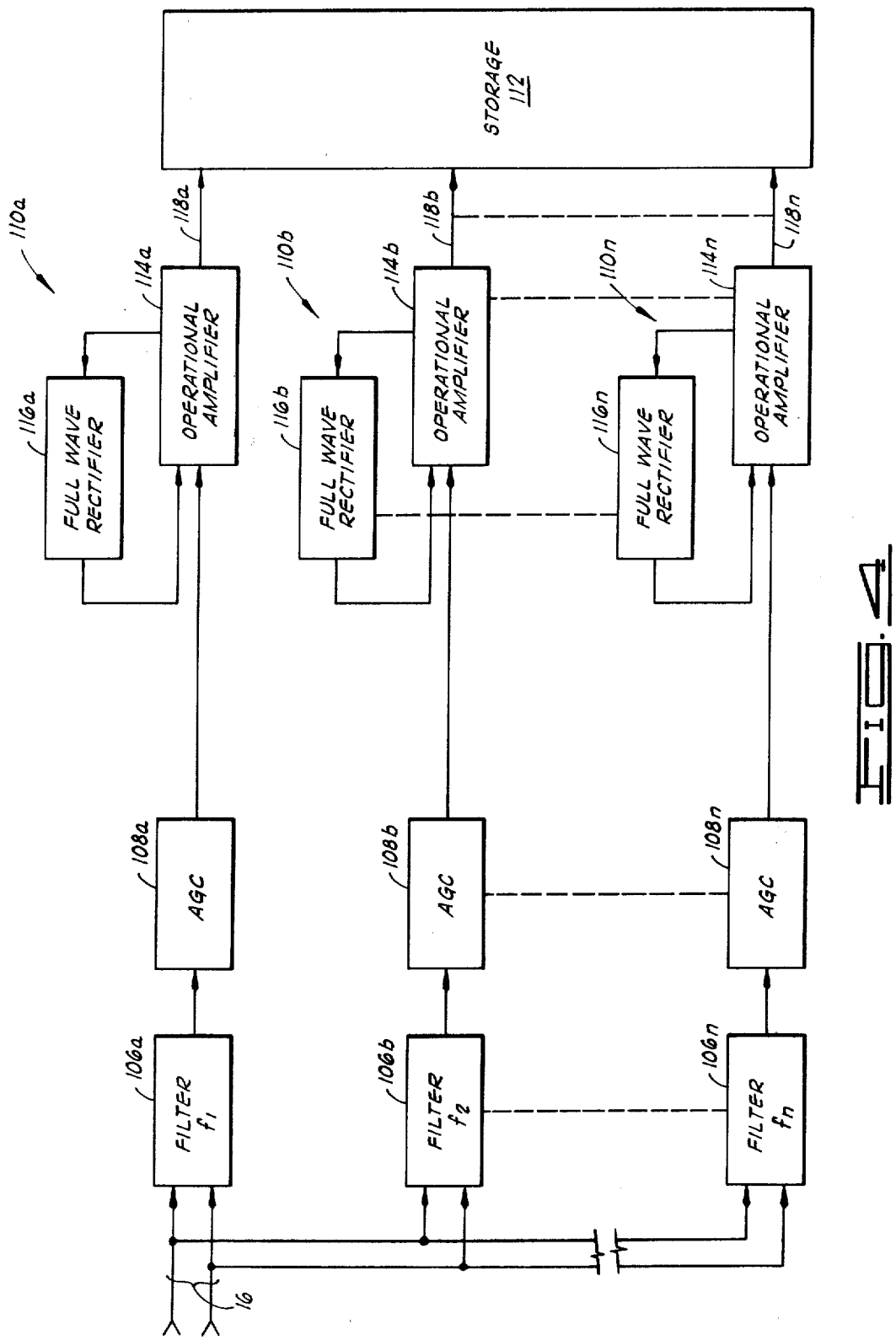

TWO-WIRE MULTIPLEX SEISMIC RECORDING SYSTEM

BACKGROUND OF THE INVENTION

1. Field of the Invention

The invention relates generally to seismic energy receiving and recording apparatus and, more particularly, but not by way of limitation, it relates to improvements in seismic energy receiving equipment as utilized in the field to receive and record pluralities of seismic energy data indications.

2. Description of the Prior Art

The prior art includes various forms of seismic receiver and interconnect cable arrays many variations of which are dictated by the exigencies of particular field applications. There is also in the prior art specific teachings directed to two-wire interconnect schemes and the most notable prior art appears to be U.S. Pat. No. Re. 23,919 entitled "System of Seismic Recording" as issued on Jan. 11, 1955 in the name of Hawkins.

SUMMARY OF THE INVENTION

The present invention contemplates a two-wire multiplexing system which transmits received seismic energy for all of a plurality of individual seismic receivers for subsequent plural track recording or processing at another location. More specifically, seismic energy indication from each receiver is amplified and modulated on a local oscillator output having a distinct frequency for that particular receiver, which modulated energy is conducted via a two-wire conductor back to a central or remote observer station. The amplifier utilized in conjunction with each seismic energy receiver is a specific type of controlled gain geophone amplifier designed to have very high gain while de-emphasizing high level noise input.

Therefore, it is an object of the present invention to provide apparatus capable of acquisition and recording of multichannel seismic data which eliminates the need for a large plurality of individual cable conductors in interconnection with a geophone array.

It is also an object of the invention to provide apparatus for acquisition of seismic energy data which can be utilized with lightweight recorder equipment.

It is yet another object of the invention to provide a two-wire multiplex apparatus for transmission of geophone output which consumes low electrical power in operation.

Finally, it is an object of the invention to provide a two-wire seismic energy receiving and recording system which is less costly and easier to maintain in the field.

Other objects and advantages of the invention will be evident from the following detailed description when read in conjunction with the accompanying drawings which illustrate the invention.

BRIEF DESCRIPTION OF THE DRAWINGS

FIG. 4 is a block diagram of central location apparatus utilized in the present invention; and

DETAILED DESCRIPTION OF THE PREFERRED EMBODIMENT

Figure 1:
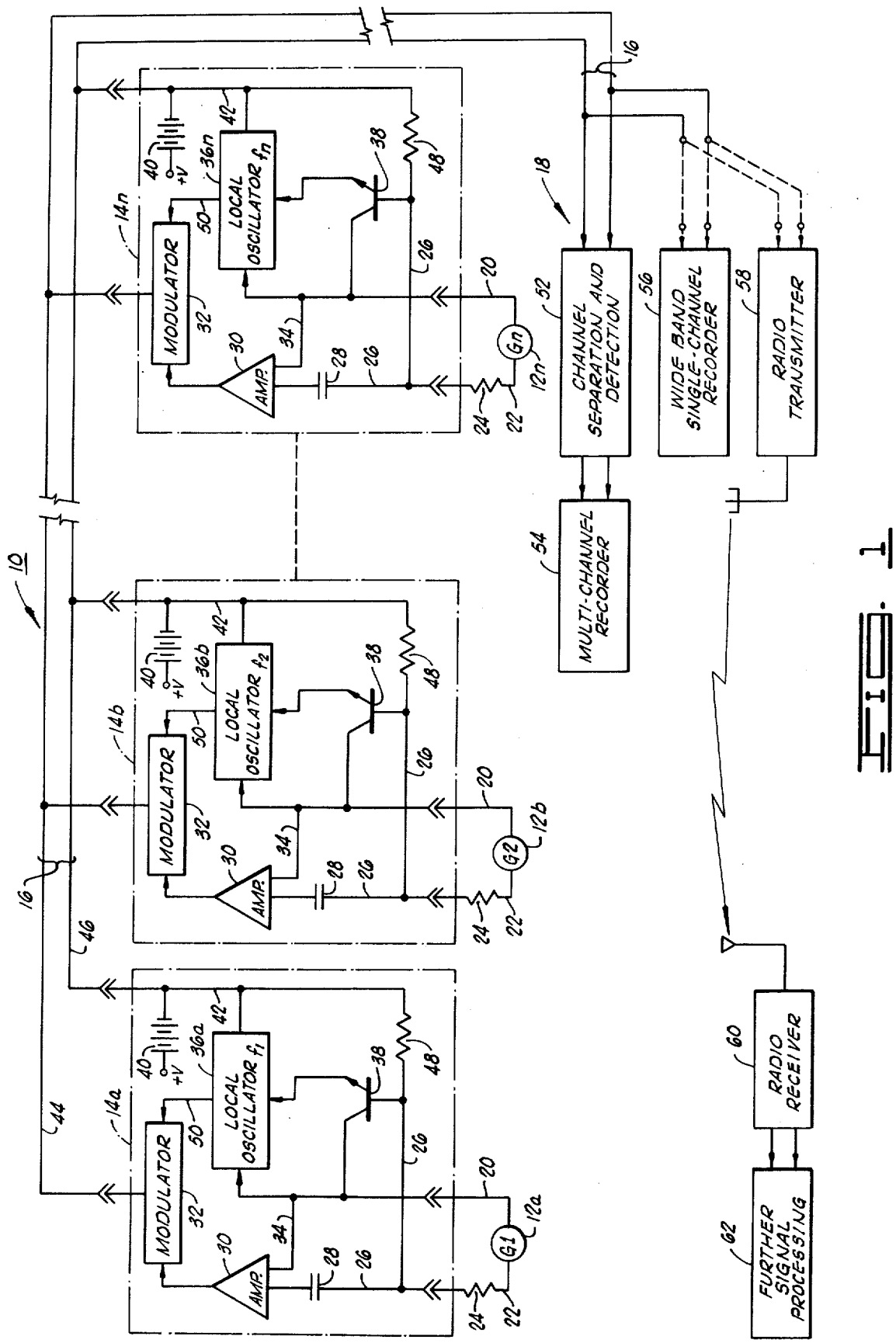
FIG. 1 is a block diagram of a seismic data acquisition system as constructed in accordance with the present invention.

Referring to FIG. 1, a seismic energy recording system 10 includes a plurality of geophones 12a, 12b through 12n each connected in combination with a respective signal module 14a, 14b through 14n. Each of the respective signal modules is then connected to a two-wire conductor 16, at selected intervals in accordance with the geophone array design, and conductor 16 may then be led to some selected central or recording location 18 where individual ones of the received seismic signals is suitably recorded.

Referring particularly to geophone module 14a, detected seismic signals from geophone 12a are input via leads 20 and 22 as suitably connected with module 14a. input lead 22 is connected through a resistor 24 and lead 26 to a d-c isolation capacitor 28 with subsequent signal input to amplifier 30. The amplified output signal from amplifier 30 is then applied to a modulator 32. The amplifier 30 will be further described below and the modulaor 32 is a commercially available integrated circuit, a transconductance type four-quadrant multiplier of Motorola Type MC1596G.

The geophone lead 20 is interconnected with a common lead 34 which is connected to amplifier 30 common as well as to a local oscillator 36 and associated switching transistor 38, a Type NPN transistor. Module power is supplied by battery 40 as connected to lead 42 with remaining positive voltage connections (not shown) being made about the circuit in conventional manner. Output from modulator 32 is connected to transmission lead 44 of two-wire conductor 16 while the remaining transmission wire 46 is connected to the return lead 42. It is also contemplated that a one-wire conductor utilizing common earth return may be utilized in some situations. This would serve to still further simplify the cable arrangement and render the geophone arrays lighter and still easier to handle.

The local oscillator 36 is a conventional form of one transistor oscillator having the collector L/C tuned to a specific frequency in accordance with the frequency multiplex scheme employed. Thus, each of local oscillators 36a, 36b through 36n would be tuned to respective different frequencies $f_1$, $f_2$ through $f_n$. The local oscillator 36a is controlled by transistor switch 38 which, in turn, is controlled by the potential on base lead 26. Thus, for example, if lead 22 of geophone 12a is disconnected the capacitor 28 charges through a resistor 48 and shuts transistor switch 38 off. Local oscillator 36a is also then non-conductive such that there is no local oscillator output signal for input via lead 50 to modulator 32 and, accordingly, there is no modulator output via conductor 44. All of geophones 12a, b-n are characterized by having low equivalent source resistances and will provide a path for d-c current flow such that a small bias current is drawn through the geophones in order to keep power turned on to the local oscillator 36a.

Each of geophone modules 14a, 14b through 14n is identical in structure, the only difference being that each local oscillator 36a, b - n is tuned to a slightly different, successively higher, frequency. Modulated carrier energy from each of modulators 32a, b - n is then conducted via the two-wire conductor 16 (conductor 44 and 46) to the central location 18 where the operator has an option as to the treatment of the frequency multiplexed signal. The frequency multiplexed signal may be applied directly to a channel separation and detection circuit 52, as will be further described below, whereupon the detected seismic energy signals are applied to a conventional form of multi-channel analog recorder 54. The plural channel data on recorder 54 is then available for additional processing such as normalization, correlation, velocity analysis, etc. Alternatively, the frequency multiplex information may be input directly to a wide band single channel recorder 56, of well known type, which simply records the total frequency multiplex signal for later processing treatment. Yet another option is available whereby the frequency multiplex signal may be input to a radio transmitter 58 for transmission to a still more remote area whereupon radio receiver 60 receives the transmitted energy and applies the frequency multiplex data to a stage 62 for further signal processing in accordance with particular requirements.

Figure 2:
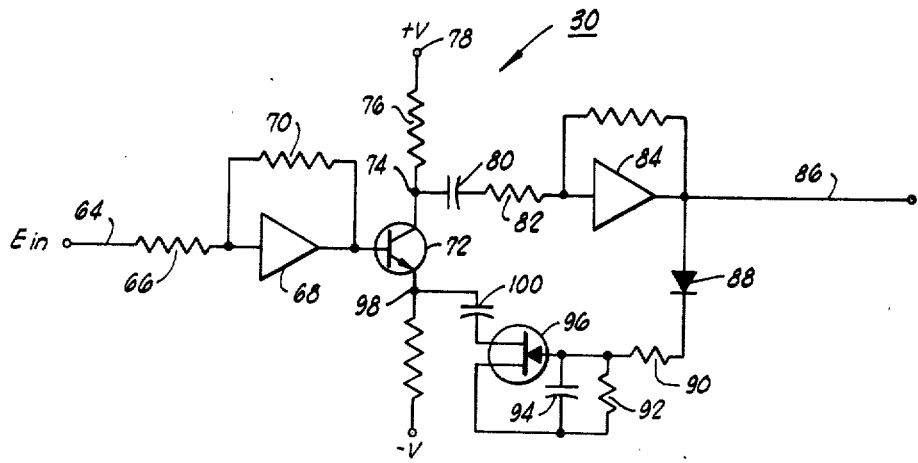
FIG. 2 is a schematic drawing of an amplifier as utilized in the invention.

Referring now to FIG. 2, the amplifier 30 is shown in full detail. The amplifier 30 is of special construction and is characterized by having an adaptative gain setting controlled in accordance with the particular signal being processed. The amplifier gain is first set by the operator upon placement in the field and, thereafter, the gain must remain at the first setting throughout the recording cycle.

The seismic signal input is applied via lead 64 and current limitng resistor 66 to a fist amplifier 68, a selected high gain, single transistor amplifier of commercially available type, e.g. an integrated circuit op-amp. Feedback signal control is provided by feedback resistor 70 and the output from amplifier 68 is applied to the base of an NPN type transistor 72. Transistor amplifier 72 is connected for collector output at junction 74 as developed by load resistor 76 in circuit with the positive voltage supply terminal 78. Amplified output from junction point 74 is applied through a coupling capcitor 80 and input resistor 82 to an amplifier 84, of type similar to amplifier 68, and amplified signal output is present on output lead 86. Additive gain setting is effected by means of the feedback network consisting of diode 88, resistor 90, resistor 92 and capacitor 94 functioning in conjunction with a voltage-controlled resistance, Field Effect Transistor 96. Emitter follower output at junction point 98 from transistor 72 is applied through a capacitor 100 to one input of FET 96 while the remaining input to FET 96 is connected in series with the parallel-connected resistor 92 and capacitor 94. A suitable type of Field Effect Transistor (FET) is the Motorola Type MPF 102.

A seismic signal is amplified through amplifier 68, transistor 72 and amplifier 84 to provide output on lead 86 which output signal level is detected by diode 88 for feedback through FET 96 to adjust the gain of transistor 72. The charging time constant is set by resistor 90 and capacitor 94 and, in practice, values are designated to set the time constant on the order of one-half second. The discharge time constant of the feedback network is determined by values of resistor 92 and capacitor 94 and this time is selected to be on the order of 5 minutes.

Figure 3:
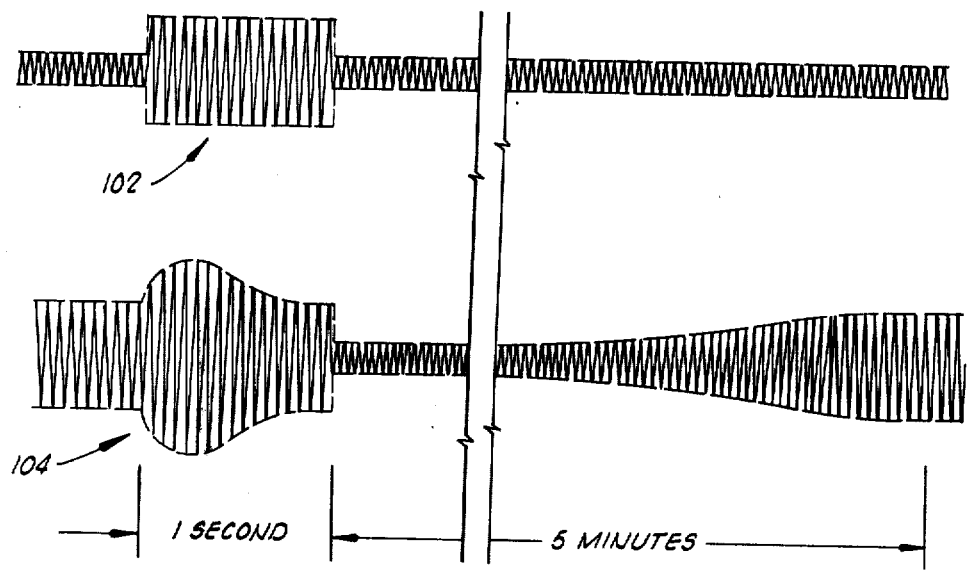
FIG. 3 is an idealized illustration relating to amplifier output amplitudes versus time.

FIG. 3 illustrates a typical gain response wherein the upper trace 102 depicts in idealized form a step change input signal while the lower trace 104 illustrates the amplifier gain response to such a step change. Thus, with an increase in input voltage, the gain control recovers in about one-half second, while with a decreasing voltage input the gain setting recovers very slowly over a period of about 5 minutes. Such adaptive gain control provides an ideal function with relation to seismic field use since geophone arrays with short offsets will have low gain requirements while those arrays with long offsets require very high gain. Amplifier 30 is designed for low equivalent input noise and gives a dynamic range of about 30 DB at maximum gain and greater than 80 DB at minimum gain.

FIG. 4 illustrates in greater detail a scheme whereby the frequency multiplexed signal on two-wire conductor 16 may be separated to provide output of the individual geophone signals. Two-wire conductor 16 is applied in parallel to each of a plurality of filters 106*a*, 106*b* through 106*n*. Filters 106*a, b - n* constitute a bank of band pass filters each having a specific channel band pass $f_1, f_2$ through $f_n$, respectively. It is desirable that signal output from a particular one of filters 106 *a, b-n* appears to be the same as its corresponding modulator output. Some loss of signal to noise will occur and amplitude levels will, in general, be different. For a given composite modulated signal transmitted down a transmission line, there will be losses which depend upon the line length and line capacitance, i.e. all frequencies will be attenuated equally by resistive losses, but high frequency carrier will be attenuated more by capacitive losses. In order to rebalance such losses due to transmission line effects, AGC circuits 108*a*, 108*b* through 108*n* next process the outputs from filters 106*a- n*, respectively, to set each channel at its correct or selected amplitude. The AGC circuits are of conventional type and serve to detect the carrier frequency only so that control effects are not affected by data modulated on the carrier channels.

Gain controlled signal output is then applied to respective demodulators 110*a*, 110*b* through 110*n* with subsequent output of the recovered seismic signal to storage equipment 112. Presently, demodulation is carried out utilizing full wave AM detection consisting of operational amplifiers 114*a*, 114*b* through 114*n* each having a respective full wave rectifier 116*a*, 116*b* through 116*n* connected in the feedback loop thereof. The current feedback from the full wave rectifiers 116*a - n* linearizes the diodes of the rectifier and reduces their effective forward voltage drop from 0.5 volts to about 0.5 millivolts, and this results in linear detection of low amplitude-signals as well as signals at near 100% modulation. Differential amplication from the full wave rectifiers 116*a - n* is required due to the unbalance relative to ground. Each of operational amplifiers 114*a*, 114*b* and 114*n* also includes a second order low pass filter thereby to provide a relatively clean detected seismic signal as present on respective output leads 118 *a*, 118*b* through 118*n* for subsequent recording in storage 112.

In operation, seismic sounding would be carried out in the field adhering to a particular shot scheme wherein a plurality of geophones and/or nests of geophones would be placed on the earth in energy coupled manner to detect shot or vibration sequences from various shot locations. In the past, each geophone would necessarily have a separate two-wire cable or conductor attached thereto and extending to a selected recording point. Such previous systems require much more time and trouble in moving and placing geophones due to the fact that a large plurality of cables necessarily had to be reeled and unreeled each time geophone placement became necessary. The present invention eases that problem by a great amount in that only two conductors, or one single cable, need be contended with in handling the geophone array.

Thus, a large plurality of geophones including their integral geophone modules 14 (see FIG. 1) are disposed in pick-up array while only a single two-wire conductor need be tended. Each geophone module 14 includes its own self-contained power supply, e.g. 8.4 volts nominal nickle/cadmium batteries, and each provides output of unique carrier frequency carrying modulations of seismic signals as detected by respective geophones 12 and processed through amplifiers 30 and modulator 32. In actual field work, the two-wire conductor 16 may be 300 ohm twin lead or two-wire twisted cable, and multi-paired twisted cables have been used to transmit several composite carriers at one time. Where terrain permits, a single insulated conductor may be employed with earth ground as return and, advantages being obvious, a single conductor wire would be still cheaper and easier to handle and would require less storage volume per length.

Seismic signals picked up by geophones 12 are amplified in an amplifier 30 which employs a network for detecting the amplifier output level for use in setting the gain of the amplifier. The gain setting range of amplifier 30 is greater than 1,000/1 and is sufficient to handle short offsets with low gain as well as long offsets with high gain. If high level noise occurs during a recording cycle, the amplifier gain is reduced to keep the noise from overpowering the signal. After such noise subsides, the gain will then increase to normal level and this function serves to edit noisy signals due to traffic sounds and other intermittent noise sources in the area.

Amplified seismic signal output from amplifiers 30 are then applied to each of modulators 32 under control of respective local oscillators 36, each functioning at a selected different frequency, and the seismic signal modulated carrier is provided as output via conductor 44 of two-wire conductor 16. The composite carrier signal is then conducted to a central or recording location 18 whereupon the composite carriers are separated by a bank of band pass filters 106 (FIG. 4) and respective gain functions are normalized by means of automatic gain control circuits 108. The individual carrier signals at respectively different carrier frequencies are then applied through demodulator 110 with subsequent recovery of the desired seismic signals for input to a storage 112, e.g. a conventional form of geophysical analog recorder having multi-channel capability.

The foregoing describes an apparatus for acquisition of multiple-channel seismic signal data utilizing only a two-wire transmission line for transmitting all geophone data to a recording station. Each geophone and associated module includes a unique amplifier circuit which includes an adaptive gain control having desirable characteristics relative to geophone detection as between widely separated or spaced source positions. It is contemplated that such frequency multiplex conduction of composite carrier signals may be utilized variously with respect to geophone arrays, subarrays and individual placements such that a very great saving in time and manpower will result.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. In a seismic signal receiving and recording system wherein a plurality of seismic signals received by geophones are modulated on respective ones of a plurality of different frequency carrier waves for frequency multiplex transmission along a two conductor line to a central recorder location, the improvement comprising:
   amplifier means receiving said seismic signal input from said geophone for amplification and output to said modulator;
   gain control means connected to control said amplifier means, said gain control means including a first resistance/capacitance combination having a fast time constant in response to increasing amplified signal level and including a second resistance/capacitance network having a very slow time constant in response to diminishing amplified signals thereby to provide adaptive gain setting of said amplifier means.

2. Apparatus as set forth in claim 1 wherein said amplifier means comprises:
   first amplifier means receiving said input seismic signal and providing amplified output;
   transistor means receiving said amplified output and providing second amplified output;
   second amplifier means receiving the output from said transistor means to provide seismic signal output to said modulator; feedback means including a diode connected to said seismic signal output in series with a voltage-controlled resistance which varies the conduction of said transistor means inversely to increases and decreases in said input seismic signal.

3. Apparatus as set forth in claim 2 which is further characterized to include:
   a resistance-capacitance network connected between said diode and said voltage-controlled resistance, said resistance-capacitance network having a fast charging time constant and a very slow discharging time constant.

4. Apparatus as set forth in claim 1 wherein said feedback network comprises:
   a diode having the negative side connected to said seismic signal outut and the positive side connected through a first resistor to the gate electrode of a field effect transistor, said field effect transistor having one base connected through a capacitor to the emitter of said transistor means and having the remaining base connected through a parallel-connected capacitance and second resistance to said gate electrode, the time constant of said capacitor and first resistane being short while the time constant of said capacitance and second resistance is very long.

5. Apparatus as set forth in claim 4 which is further characterized in that:
   each of said first and second amplifier means are operational amplifiers.

6. A method for amplifying received seismic energy signals of pre-set duration for conduction of amplifier output signal to further processing and recording equipment comprising:
   continually amplifying said received seismic energy signals while controlling the gain of amplification at an adaptive rate determined by presence of noise in said signal; and rectifying the output of said amplified output signal for input to control said gain of amplification to increase at pre-determined rates over said pre-set duration, and wherein said adaptative rate effects a gain control recovery in approximately one-half second with an increase in input seismic energy signals, and effects gain control recovery very slowly over a period of approximately five minutes with a decrease in input seismic energy signal.

7. A method as set forth in claim 6 which is further characterized in that:

said gain of amplification range is greater than 1000 to 1 and sufficient to amplify near seismic energy signals at relatively low gain while amplifying distant seismic energy signals at relatively high gain.

8. A method as set forth in claim 7 wherein: the amplifying of said seismic energy signals is effected at low equivalent input noise to give a dynamic range of about 30 db at maximum gain and greater than 80 db at minimum gain.

9. A method as set forth in claim 6 wherein:

said amplified output signal is modulated on a carrier signal of pre-determined frequency for subsequent separation and processing at a remote location.

10. A method as set forth in claim 9 wherein:

said separation is effected by a bandpass filter functioning to pass said pre-determined frequency and subsequent automatic gain control circuitry which is responsive only to said carrier signal and is not affected by said amplified output signal modulated thereon.

* * * * *